(12) United States Patent
Kitazawa et al.

(10) Patent No.: US 11,041,072 B2
(45) Date of Patent: Jun. 22, 2021

(54) ONE-PACK ADDITION CURABLE SILICONE COMPOSITION, METHOD FOR STORING SAME, AND METHOD FOR CURING SAME

(71) Applicant: SHIN-ETSU CHEMICAL CO., LTD., Tokyo (JP)

(72) Inventors: Keita Kitazawa, Annaka (JP); Kohei Masuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/678,591

(22) Filed: Nov. 8, 2019

(65) Prior Publication Data

US 2020/0071526 A1 Mar. 5, 2020

Related U.S. Application Data

(62) Division of application No. 15/529,302, filed as application No. PCT/JP2015/079667 on Oct. 21, 2015, now abandoned.

(30) Foreign Application Priority Data

Nov. 25, 2014 (JP) ................................. 2014-237302

(51) Int. Cl.
| | |
|---|---|
| *C08L 83/04* | (2006.01) |
| *B05D 3/04* | (2006.01) |
| *C08K 5/53* | (2006.01) |
| *C08L 83/06* | (2006.01) |
| *C08K 3/22* | (2006.01) |
| *C08K 3/08* | (2006.01) |
| *C08K 3/28* | (2006.01) |
| *C08K 5/5419* | (2006.01) |
| *C08G 77/12* | (2006.01) |
| *C08G 77/20* | (2006.01) |

(52) U.S. Cl.
CPC ............ *C08L 83/04* (2013.01); *B05D 3/0406* (2013.01); *C08G 77/12* (2013.01); *C08G 77/20* (2013.01); *C08K 3/08* (2013.01); *C08K 3/22* (2013.01); *C08K 3/28* (2013.01); *C08K 5/53* (2013.01); *C08K 5/5419* (2013.01); *C08L 83/06* (2013.01); *C08L 2205/025* (2013.01)

(58) Field of Classification Search
CPC ... C08K 3/08; C08K 3/14; C08K 3/22; C08G 77/12; C08G 77/20
See application file for complete search history.

(56) References Cited

U.S. PATENT DOCUMENTS

| | | |
|---|---|---|
| 3,188,300 A | 6/1965 | Chalk |
| 4,851,452 A | 7/1989 | Gross et al. |
| 6,187,890 B1 | 2/2001 | Fehn et al. |
| 6,649,258 B2 | 11/2003 | Yamada et al. |
| 8,017,684 B2 | 9/2011 | Endo et al. |
| 8,211,545 B2 | 7/2012 | Asaine |
| 8,334,054 B2 | 12/2012 | Endo et al. |
| 8,754,165 B2 | 6/2014 | Matsumoto et al. |
| 2005/0049350 A1 | 3/2005 | Tonapi et al. |
| 2005/0256259 A1 | 11/2005 | Goto et al. |
| 2006/0047097 A1 | 3/2006 | Tanaka et al. |
| 2006/0089455 A1 | 4/2006 | Sterin et al. |
| 2009/0088524 A1 | 4/2009 | Koellnberger |
| 2012/0292558 A1 | 11/2012 | Kodama et al. |
| 2016/0096984 A1 | 4/2016 | Matsumoto |

FOREIGN PATENT DOCUMENTS

| | | |
|---|---|---|
| CN | 103214853 A | 7/2013 |
| EP | 0 939 115 A1 | 9/1999 |
| FR | 2047960 | 3/1971 |
| GB | 1 310 353 | 3/1973 |
| JP | 2-88650 A | 3/1990 |
| JP | 3-131656 A | 6/1991 |
| JP | 11-140322 A | 5/1999 |
| JP | 2938428 B1 | 8/1999 |
| JP | 2938429 B1 | 8/1999 |
| JP | 2000-63672 A | 2/2000 |
| JP | 3580366 B2 | 10/2004 |
| JP | 2006-63142 A | 3/2006 |
| JP | 3952184 B2 | 8/2007 |
| JP | 2008-260798 A | 10/2008 |
| JP | 2008-280395 A | 11/2008 |

(Continued)

OTHER PUBLICATIONS

Chinese Office Action and Search Report dated Nov. 22, 2019, for corresponding Chinese Application No. 201580064002.X.

(Continued)

*Primary Examiner* — Wenwen Cai
(74) *Attorney, Agent, or Firm* — Birch, Stewart, Kolasch & Birch, LLP

(57) ABSTRACT

Provided are a one-pack addition curable silicone composition compatible with both a good long-term storage property at room temperature under conditions whereby air is blocked to a constant level and the advance of an addition curing reaction at room temperature by being applied in a thin film of 1500 μm or less and exposed to air, which could not be obtained by conventional curable heat-dissipating grease, and a method for storing the same, and a method for curing this composition. A one-pack addition curable silicone composition having as essential ingredients: (A) organopolysiloxane having silicon-atom-bonded aliphatic unsaturated hydrocarbon groups and a specific kinematic viscosity; (B) one or more thermally conductive fillers selected from metals, metal oxides, metal hydroxides, metal nitrides, metal carbides, and allotropes of carbon; (C) organohydrogenpolysiloxane; and (D) a platinum group metal complex having an organic phosphorus compound represented by formula (1)

$$R^1_x\text{—P—}(OR^1)_{3-x} \qquad (1)$$

($R^1$ is a monovalent hydrocarbon group, x is 0-3) as a ligand.

3 Claims, No Drawings

(56) References Cited

FOREIGN PATENT DOCUMENTS

| | | |
|---|---|---|
| JP | 2009-144024 A | 7/2009 |
| JP | 2009-209165 A | 9/2009 |
| JP | 4572243 B2 | 11/2010 |
| JP | 4656340 B2 | 3/2011 |
| JP | 2011-153252 A | 8/2011 |
| JP | 4913874 B2 | 4/2012 |
| JP | 4917380 B2 | 4/2012 |
| JP | 4933094 B2 | 5/2012 |
| JP | 5365572 B2 | 12/2013 |
| JP | 2014-80546 A | 5/2014 |
| JP | 2014-218564 A | 11/2014 |
| WO | WO 03/092890 A2 | 11/2003 |
| WO | WO 2010/009755 A1 | 1/2010 |

OTHER PUBLICATIONS

Extended European Search Report dated Jun. 15, 2018, in European Patent Application No. 15863390.9.
International Search Report for PCT/JP2015/079667 dated Jan. 19, 2016.
Written Opinion of the International Searching Authority for PCT/JP2015/079667 (PCT/ISA/237) dated Jan. 19, 2016.

ONE-PACK ADDITION CURABLE SILICONE COMPOSITION, METHOD FOR STORING SAME, AND METHOD FOR CURING SAME

This application is a Divisional of U.S. patent application Ser. No. 15/529,302 filed on May 24, 2017, which is the National Phase of PCT/JP2015/079667 filed Oct. 21, 2015, which claims priority under 35 U.S.C. § 119(a) to Patent Application No. 2014-237302 filed in Japan on Nov. 25, 2014, all of which are hereby expressly incorporated by reference into the present application.

TECHNICAL FIELD

This invention relates to a one-pack addition curable silicone composition. More particularly, it relates to a one-pack addition curable silicone composition for providing a highly heat conductive silicone grease, which meets both long-term storage stability at room temperature under limited air-shutoff conditions and the progress of addition cure reaction at room temperature when it is applied as a thin film of up to 1,500 μm and exposed to air, a method for storing the composition, and a method for curing the composition.

BACKGROUND ART

It is well known that electronic parts such as semiconductor packages generate heat during operation and concomitantly degrade their performance. A variety of heat dissipating techniques are used to solve the problem. One common technique is by disposing a cooling member such as heat spreader near a heat generating member, bringing them in close contact, and effectively removing heat from the cooling member.

If a gap is left between the heat generating member and the cooling member, the heat transfer becomes inefficient due to the intervention of least heat conductive air, failing to fully reduce the temperature of the heat generating member. For the purpose of preventing air intervention to avoid such a phenomenon, heat dissipating greases and sheets having a high thermal conductivity and conformable to the member surface are employed (Patent Documents 1 to 11: JP 2938428, JP 2938429, JP 3580366, JP 3952184, JP 4572243, JP 4656340, JP 4913874, JP 4917380, JP 4933094, JP-A 2008-260798, JP-A 2009-209165).

In practice, heat dissipating grease which can be compressed thin is preferred as a thermal countermeasure for semiconductor packages, from the standpoint of heat dissipating ability. The heat dissipating grease is generally divided into two types, grease of non-cure type which remains greasy without curing and grease of cure type which can be cured after compression to a desired thickness.

The heat dissipating grease of non-cure type is generally characterized by ease of handling such as possible storage at room temperature. Since a semiconductor package undergoes expansion and contraction by the thermal hysteresis of heating and cooling of the heat generating member, the heat dissipating grease of non-cure type is likely to flow out of the semiconductor package (known as pump-out) and is rarely regarded preferable from the standpoint of reliability.

On the other hand, the heat dissipating grease of cure type, which is compressed to a desired thickness and then cured, is less prone to pump-out and makes the semiconductor package more reliable, but has practical disadvantages.

For example, many heat dissipating greases of addition cure type are proposed in the past as the thermal countermeasure for semiconductor packages (e.g., Patent Document 12: JP-A 2014-080546). However, most of these greases lack storage stability at room temperature and must be stored in freezers or refrigerators, suggesting difficult management of products. To cure the grease, a certain time of heating is necessary, inviting a lowering of production efficiency due to complicated steps and extended duration. Further the heating step poses an environmental load. From such standpoints, these heat dissipating greases are not regarded preferable.

Also included in the cure type is heat dissipating grease of condensation cure type (e.g., Patent Document 13: JP 5365572). Although the heat dissipating grease of condensation cure type thickens and cures by airborne moisture, it can be stored at room temperature if moisture is shut off, indicating relatively easy management of products. The heat dissipating grease of condensation cure type has the advantage that curing reaction takes place without a need for heating step as long as a certain amount of moisture is available. However, the grease gives off low-boiling ingredients during the curing reaction, leaving serious problems including a foul odor and contamination of electronic parts with the released ingredients.

Although the use of heat dissipating greases of cure type is preferred in order to enhance the reliability of semiconductor packages as discussed above, the heat dissipating greases proposed in the prior art are rarely regarded satisfactory from the standpoints of product management, curing process and curing reaction mechanism.

PRIOR ART DOCUMENTS

Patent Documents

Patent Document 1: JP 2938428
Patent Document 2: JP 2938429
Patent Document 3: JP 3580366
Patent Document 4: JP 3952184
Patent Document 5: JP 4572243
Patent Document 6: JP 4656340
Patent Document 7: JP 4913874
Patent Document 8: JP 4917380
Patent Document 9: JP 4933094
Patent Document 10: JP-A 2008-260798
Patent Document 11: JP-A 2009-209165
Patent Document 12: JP-A 2014-080546
Patent Document 13: JP 5365572

SUMMARY OF THE INVENTION

Problems to be Solved by the Invention

An object of the invention, which has been made under the above-mentioned circumstances, is to provide a one-pack addition curable silicone composition which meets both long-term storage stability at room temperature under limited air-shutoff conditions and the progress of addition cure reaction at room temperature when it is applied as a thin film of up to 1,500 μm and exposed to air, which are not achievable with the prior art heat dissipating greases of cure type; a method for storing the composition; and a method for curing the composition.

Means for Solving the Problems

Making extensive investigations to attain the above objects, the inventors have found that a one-pack addition curable silicone composition comprising an aliphatic unsaturated hydrocarbon group-containing organopolysiloxane, a heat conductive filler, an organohydrogenpolysiloxane, and a platinum group metal complex coordinated with a specific organophosphorus compound meets both long-term storage stability at room temperature under limited air-shutoff conditions and the progress of addition cure reaction at room temperature when it is applied as a thin film of up to 1,500 μm and exposed to air. The present invention is predicated on this finding.

Accordingly, the invention provides a one-pack addition curable silicone composition, a method for storing the composition, and a method for curing the composition, as defined below.

[1] A one-pack addition curable silicone composition comprising as essential components:

(A) 100 parts by weight of an organopolysiloxane containing at least two silicon-bonded aliphatic unsaturated hydrocarbon groups per molecule and having a kinematic viscosity of 60 to 100,000 mm²/s at 25° C., (B) 100 to 3,000 parts by weight of at least one heat conductive filler selected from the group consisting of metals, metal oxides, metal hydroxides, metal nitrides, metal carbides, and carbon allotropes, (C) an organohydrogenpolysiloxane containing at least two silicon-bonded hydrogen atoms (i.e., SiH groups) per molecule in such an amount that the number of SiH groups divided by the total number of aliphatic unsaturated hydrocarbon groups in component (A) is 0.5 to 5, and (D) an effective amount of a platinum group metal complex coordinated with an organophosphorus compound represented by the general formula (1):

Chemical Formula 1

$$R^1_x—P—(OR^1)_{3-x} \qquad (1)$$

wherein $R^1$ which may be the same or different is an optionally substituted monovalent hydrocarbon group of 1 to 20 carbon atoms, and x is an integer of 0 to 3.

[2] The one-pack addition curable silicone composition of [1], further comprising (E) 1 to 200 parts by weight per 100 parts by weight of component (A) of a hydrolyzable organopolysiloxane compound having the general formula (2):

[Chemical Formula 2]

(2)

wherein $R^1$ which may be the same or different is an optionally substituted monovalent hydrocarbon group of 1 to 20 carbon atoms, and m is an integer of 5 to 100.

[3] The one-pack addition curable silicone composition of [1] or [2], further comprising (F) 0.01 to 10 parts by weight per 100 parts by weight of component (A) of a hydrolyzable organosilane compound having the general formula (3):

[Chemical Formula 3]

$$R^2—Si(OR^1)_3 \qquad (3)$$

wherein $R^1$ which may be the same or different is an optionally substituted monovalent hydrocarbon group of 1 to 20 carbon atoms, and $R^2$ is an optionally substituted monovalent hydrocarbon group of 1 to 20 carbon atoms.

[4] The one-pack addition curable silicone composition of any one of [1] to [3] wherein a storage stability of at least 3 months at 25° C. is developed when it is stored in a closed container made of a material having an oxygen permeability constant of up to $1\times10^{-12}$ cm³ (STP) cm/cm²·s·Pa, and addition cure reaction takes place at room temperature when it is applied as a thin film having a thickness of up to 1,500 μm and exposed to air.

[5] A method for storing the one-pack addition curable silicone composition of any one of [1] to [4], comprising the step of storing the one-pack addition curable silicone composition in a closed container made of a material having an oxygen permeability constant of up to $1\times10^{-12}$ cm³ (STP) cm/cm²·s·Pa, whereby the silicone composition develops a storage stability of at least 3 months at 25° C.

[6] A method for curing the one-pack addition curable silicone composition of any one of [1] to [4], comprising the steps of applying the one-pack addition curable silicone composition as a thin film having a thickness of up to 1,500 μm and exposing the film to air at room temperature for allowing addition cure reaction to take place at room temperature.

Advantageous Effects of the Invention

The one-pack addition curable silicone composition of the invention meets both long-term storage stability at room temperature under limited air-shutoff conditions and the progress of addition cure reaction at room temperature when it is applied as a thin film of up to 1,500 μm and exposed to air, which are difficult to achieve with the prior art.

EMBODIMENT FOR CARRYING OUT THE INVENTION

Below the invention is described in detail.

The invention provides a one-pack addition curable silicone composition comprising the following components (A) to (D) as essential components:

(A) an organopolysiloxane containing at least two silicon-bonded aliphatic unsaturated hydrocarbon groups per molecule and having a kinematic viscosity of 60 to 100,000 mm²/s at 25° C., (B) at least one heat conductive filler selected from the group consisting of metals, metal oxides, metal hydroxides, metal nitrides, metal carbides, and carbon allotropes, (C) an organohydrogenpolysiloxane containing at least two silicon-bonded hydrogen atoms (i.e., SiH groups) per molecule, and (D) a platinum group metal complex coordinated with an organophosphorus compound represented by the general formula (1):

[Chemical Formula 4]

$$R^1_x—P—(OR^1)_{3-x} \qquad (1)$$

wherein IV which may be the same or different is an optionally substituted monovalent hydrocarbon group of 1 to 20 carbon atoms, and x is an integer of 0 to 3.

Component (A)

Component (A) is an organopolysiloxane containing at least two silicon-bonded aliphatic unsaturated hydrocarbon groups per molecule and having a kinematic viscosity of 60 to 100,000 mm²/s at 25° C.

The aliphatic unsaturated hydrocarbon groups bonded to a silicon atom in the organopolysiloxane are preferably monovalent hydrocarbon groups of 2 to 8 carbon atoms, especially 2 to 6 carbon atoms, having an aliphatic unsaturated bond. Alkenyl groups are more preferred, with exemplary alkenyl groups including vinyl, allyl, propenyl, isopropenyl, butenyl, hexenyl, cyclohexenyl, and octenyl. Inter alia, vinyl is most preferred.

The aliphatic unsaturated hydrocarbon group may be bonded to a silicon atom at the end of the molecular chain or a silicon atom at an intermediate position of the molecular chain or both.

The organopolysiloxane has organic groups other than the silicon-bonded aliphatic unsaturated hydrocarbon group, which are preferably substituted or unsubstituted, aliphatic unsaturation-free, monovalent hydrocarbon groups of 1 to 18 carbon atoms, more preferably 1 to 10 carbon atoms, and even more preferably 1 to 8 carbon atoms. Examples include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl, or substituted forms of the foregoing groups in which one or more or even all hydrogen atoms are substituted by halogen atoms such as fluorine, bromine or chlorine, cyano or the like, for example, chloromethyl, chloropropyl, bromoethyl, trifluoropropyl and cyanoethyl. Inter alia, methyl is most preferred.

The organopolysiloxane should have a kinematic viscosity at 25° C. of 60 to 100,000 $mm^2/s$, preferably 100 to 30,000 $mm^2/s$. With a kinematic viscosity of less than 60 $mm^2/s$, the silicone composition has poor physical properties. With a kinematic viscosity in excess of 100,000 $mm^2/s$, the silicone composition becomes less extensible.

As used herein, the kinematic viscosity is as measured at 25° C. by an Ostwald viscometer of Ubbelohde type (same hereinafter).

The molecular structure of the organopolysiloxane is not particularly limited as long as it has the above-defined property, and may be a linear structure, branched structure, or linear structure having partial branched or cyclic structure. In particular, a linear structure organopolysiloxane having a backbone consisting of repeating diorganosiloxane units and capped with triorganosiloxy groups at both ends of the molecular chain is preferred. The linear structure organopolysiloxane may have, in part, a branched or cyclic structure.

The organopolysiloxane may be used alone or in admixture of two or more.

Component (B)

Component (B) is a heat conductive filler which is at least one substance selected from the group consisting of metals, metal oxides, metal hydroxides, metal nitrides, metal carbides, and carbon allotropes. Examples include aluminum, silver, copper, metallic silicon, alumina, zinc oxide, magnesium oxide, silicon dioxide, cerium oxide, iron oxide, aluminum hydroxide, cerium hydroxide, aluminum nitride, boron nitride, silicon carbide, diamond, graphite, carbon nanotubes, and graphene. Preferred is a combination of a large particulate fraction and a small particulate fraction.

In the combination, the large particulate fraction preferably has an average particle size in the range of 0.1 to 100 µm, more preferably 1 to 40 µm, for the reason that if the particle size is less than 0.1 µm, the resulting composition may have too high a viscosity and become less extensible and if the particle size exceeds 100 µm, the resulting composition may become non-uniform. Also the small particulate fraction preferably has an average particle size in the range of 0.01 to 10 µm, more preferably 0.1 to 4 µm, for the reason that if the particle size is less than 0.01 µm, the resulting composition may have too high a viscosity and become less extensible and if the particle size exceeds 10 µm, the resulting composition may become non-uniform. As used herein, the average particle size may be determined, for example, as a weight average value (or median diameter) on particle size distribution measurement by the laser light diffraction method.

The shape of the large and small particulate fractions may be spherical, irregular, needle or the like, while the shape is not particularly limited.

The amount of component (B) added is 100 to 3,000 parts, preferably 500 to 2,800 parts by weight per 100 parts by weight of component (A), for the reason that if the amount exceeds 3,000 parts, the resulting composition becomes less extensible and if the amount is less than 100 parts, the resulting composition becomes less heat conductive.

Component (C)

Component (C) is an organohydrogenpolysiloxane containing at least two, preferably at least 3, more preferably 3 to 100, and even more preferably 3 to 20 silicon-bonded hydrogen atoms (i.e., SiH groups) per molecule. The organohydrogenpolysiloxane is such that SiH groups in its molecule may undergo addition reaction with aliphatic unsaturated hydrocarbon groups in component (A) in the presence of a platinum group metal complex to be described later, to form a crosslinked structure.

The molecular structure of the organohydrogenpolysiloxane is not particularly limited as long as it has the above-defined nature, and may be a linear structure, branched structure, cyclic structure or linear structure having partial branched or cyclic structure. The linear or cyclic structure is preferred.

The organohydrogenpolysiloxane should preferably have a kinematic viscosity at 25° C. of 1.0 to 1,000 $mm^2/s$, more preferably 10 to 100 $mm^2/s$. With a kinematic viscosity of at least 1.0 $mm^2/s$, the silicone composition may not have poor physical properties. With a kinematic viscosity of 1,000 $mm^2/s$ or less, the silicone composition may not become less extensible.

The organohydrogenpolysiloxane has silicon-bonded organic groups, which are preferably organic groups other than aliphatic unsaturated hydrocarbon groups, more preferably substituted or unsubstituted, aliphatic unsaturation-free, monovalent hydrocarbon groups of 1 to 12 carbon atoms, more preferably 1 to 10 carbon atoms. Examples include alkyl groups such as methyl, ethyl, propyl, butyl, hexyl, and dodecyl; aryl groups such as phenyl; aralkyl groups such as 2-phenylethyl and 2-phenylpropyl; and substituted forms of the foregoing groups in which one or more or even all hydrogen atoms are substituted by halogen atoms such as fluorine, bromine or chlorine, cyano or the like, for example, chloromethyl, chloropropyl, bromoethyl, trifluoropropyl and cyanoethyl, as well as epoxy ring-containing organic groups (glycidyl or glycidyloxy-substituted alkyl groups) such as 2-glycidoxyethyl, 3-glycidoxypropyl and 4-glycidoxybutyl.

The organohydrogenpolysiloxane may be used alone or in admixture of two or more.

The amount of the organohydrogenpolysiloxane added as component (C) is such that the number of SiH groups divided by the total number of aliphatic unsaturated hydrocarbon groups in component (A) ranges from 0.5 to 5, preferably from 0.8 to 3, and more preferably from 1 to 2. If the amount of component (C) added is less than the lower limit, addition reaction does not take place to a full extent, resulting in short crosslinking. If the amount of component (C) exceeds the upper limit, the composition may form a non-uniform crosslinked structure or may not cure.

Component (D)

Component (D) is a hydrosilylation catalyst which functions to promote addition reaction, i.e., a platinum group metal complex coordinated with an organophosphorus compound represented by the general formula (1):

[Chemical Formula 5]

$$R^1_x\text{—}P\text{—}(OR^1)_{3-x} \quad (1)$$

wherein IV which may be the same or different is an optionally substituted monovalent hydrocarbon group of 1 to 20 carbon atoms, and x is an integer of 0 to 3.

In formula (1), $R^1$ is an optionally substituted monovalent hydrocarbon group of 1 to 20 carbon atoms, preferably an optionally substituted monovalent saturated aliphatic hydrocarbon group, optionally substituted monovalent unsaturated aliphatic hydrocarbon group or optionally substituted monovalent aromatic hydrocarbon group (inclusive of aromatic heterocycle), more preferably an optionally substituted monovalent saturated aliphatic hydrocarbon group or optionally substituted monovalent aromatic hydrocarbon group, and most preferably an optionally substituted monovalent saturated aliphatic hydrocarbon group.

Exemplary of the optionally substituted monovalent saturated aliphatic hydrocarbon group are those of 1 to 20 carbon atoms, preferably 1 to 14 carbon atoms, and more preferably 1 to 12 carbon atoms, including straight alkyl groups such as methyl, ethyl, propyl, butyl, pentyl, hexyl, heptyl, and octyl, branched alkyl groups such as isopropyl, isobutyl, tert-butyl, isopentyl, neopentyl, and ethylhexyl, cycloalkyl groups such as cyclopentyl, cyclohexyl, and cycloheptyl, and halo-substituted alkyl groups such as chloromethyl, 3-chloropropyl, 3,3,3-trifluoropropyl and bromopropyl.

Exemplary of the optionally substituted monovalent unsaturated aliphatic hydrocarbon group are those of 2 to 20 carbon atoms, preferably 2 to 12 carbon atoms, and more preferably 2 to 6 carbon atoms, including alkenyl groups such as ethenyl, 1-methylethenyl and 2-propenyl, and alkynyl groups such as ethynyl and 2-propynyl.

Exemplary of the optionally substituted monovalent aromatic hydrocarbon group (inclusive of aromatic heterocycle) are those of 4 to 20 carbon atoms, preferably 4 to 12 carbon atoms, including aryl groups such as phenyl, tolyl and naphthyl, aralkyl groups such as benzyl and 2-phenylethyl, halo-substituted aryl groups such as α,α,α-trifluorotolyl and chlorobenzyl, and aromatic heterocycles such as furyl and thienyl.

Among these, $R^1$ is preferably methyl, ethyl, propyl, butyl, hexyl, octyl, phenyl or tolyl, more preferably ethyl, butyl, hexyl, octyl or phenyl, and even more preferably ethyl, butyl, hexyl or octyl.

The subscript x is an integer of 0 to 3. Although x is preferably a smaller integer because a more catalytic function is available, even a mixture of an organophosphorus compound wherein x=0 and an organophosphorus compound wherein x=3, for example, may exert a sufficient catalytic function.

Examples of the organophosphorus compound include triphenyl phosphite, trihexyl phosphite, triethyl phosphite, triphenylphosphine, and trihexylphosphine.

Notably, the organophosphorus compound may be used alone or in admixture of two or more.

Examples of the platinum group atom serving as the center metal in the platinum group metal complex include ruthenium, rhodium, palladium, osmium, iridium, and platinum. Inter alia, platinum is preferable as the center metal in the hydrosilylation catalyst because it is rather readily available.

Component (D) may be obtained by adding an organophosphorus compound having formula (1) to a platinum group metal or platinum group metal compound, and stirring them in the presence or absence of an arbitrary solvent at a predetermined temperature for a predetermined time. Then the organophosphorus compound having formula (1) strongly coordinates to the center metal so that the one-pack addition curable silicone composition may develop long-term storage stability at room temperature under limited air-shutoff conditions.

As the platinum group metal or platinum group metal compound, platinum metal or platinum compounds are preferred. Suitable platinum compounds include platinum chloride, chloroplatinic acid, alcohol-modified chloroplatinic acid, platinum-divinyltetramethyldisiloxane, platinum-olefin complexes such as platinum-cyclovinylmethylsiloxane complex, platinum-carbonyl complexes such as platinum carbonylvinylmethyl complex, and platinum-octylaldehyde/octanol complex.

On the other hand, when the one-pack addition curable silicone composition is applied as a thin film and exposed to air, airborne oxygen activates the platinum group metal complex coordinated with an organophosphorus compound having formula (1) (i.e., hydrosilylation catalyst) in the presence of the organohydrogenpolysiloxane as component (C) whereby addition cure reaction can take place at room temperature.

In preparing component (D), the organophosphorus compound having formula (1) may be added in an amount of 1 to 12 equivalents, preferably 1.5 to 10 equivalents, and more preferably 2 to 8 equivalents per platinum group atom serving as the center metal. If the amount of the organophosphorus compound having formula (1) is less than 1 equivalent, long-term storage stability at room temperature under air-shutoff conditions may not be developed. If the amount exceeds 12 equivalents, addition cure reaction may not take place at room temperature even when the silicone composition is applied as a thin film and exposed to air.

The amount of component (D) added may be a catalytic amount and is not particularly limited. Specifically, component (D) may be added in such an amount as to provide 0.1 to 1,000 ppm, preferably 1 to 500 ppm, and more preferably 1 to 100 ppm of platinum group atom based on the weight of component (A). If the addition amount is too small, addition reaction is substantially retarded, or the composition may not cure. Inversely, an excessive amount may invite a loss of long-term storage stability at room temperature and a drop of heat resistance of silicone cured product at the end of curing, and is economically disadvantageous because the platinum group metal is expensive.

Components (E) and (F)

The one-pack addition curable silicone composition of the invention may further comprise (E) a hydrolyzable organopolysiloxane compound having the general formula (2) and/or (F) a hydrolyzable organosilane compound having the general formula (3).

While the hydrolyzable organopolysiloxane compound as component (E) and the hydrolyzable organosilane compound as component (F) are used for treating the surface of the heat conductive filler, they not only help the composition be filled with the filler more densely, but also prevent filler particles from agglomerating together by covering their surface. They also serve to enhance the heat resistance of the silicone cured product because their effects sustain even at elevated temperature.

[Chemical Formula 6]

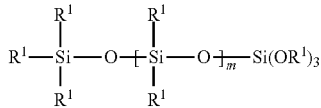

(2)

Herein $R^1$ which may be the same or different is an optionally substituted monovalent hydrocarbon group of 1 to 20 carbon atoms, and m is an integer of 5 to 100, preferably 10 to 80.

[Chemical Formula 7]

$$R^2\text{—}Si(OR^1)_3 \quad (3)$$

Herein $R^1$ which may be the same or different is an optionally substituted monovalent hydrocarbon group of 1 to 20 carbon atoms, and $R^2$ is an optionally substituted monovalent hydrocarbon group of 1 to 20 carbon atoms.

Examples of the group $R^1$ in formulae (2) and (3) are as exemplified above for $R^1$. Among others, methyl, ethyl, 3,3,3-trifluoropropyl and phenyl are preferred, methyl, ethyl and phenyl are more preferred, and methyl is most preferred.

Examples of the group $R^2$ in formula (3) are as exemplified above for $R^1$. Among others, unsubstituted straight alkyl groups of 4 to 20 carbon atoms are preferred, unsubstituted straight alkyl groups of 6 to 14 carbon atoms are more preferred, and unsubstituted straight alkyl groups of 6 to 12 carbon atoms are most preferred.

The amount of the hydrolyzable organopolysiloxane compound added as component (E) is preferably 1 to 200 parts by weight, more preferably 5 to 100 parts by weight per 100 parts by weight of component (A) because an excessive amount may invite a likelihood of oil bleeding and prevent full progress of curing reaction.

The amount of the hydrolyzable organosilane compound added as component (F) is preferably 0.01 to 10 parts by weight, more preferably 0.1 to 8 parts by weight per 100 parts by weight of component (A) because an excessive amount may invite a likelihood of oil bleeding and void formation.

Other Components

To the one-pack addition curable silicone composition of the invention, prior art well-known regulators such as acetylene alcohols may be added for improving the storage stability of the composition. Also non-reactive organo(poly)siloxanes such as methylpolysiloxane may be added for adjusting the modulus and viscosity of the composition. Further, if desired, prior art well-known antioxidants such as 2,6-di-tert-butyl-4-methylphenol may be added for preventing the silicone composition from degradation. Further, dyes, pigments, flame retardants, anti-settling agents, and thixotropic agents may be added if desired. These additives may be added in any amounts as long as the objects of the invention are not impaired.

Method for Preparing One-Pack Addition Curable Silicone Composition

A further embodiment of the invention is a method for preparing the one-pack addition curable silicone composition, which is described below, but not limited thereto.

The method for preparing the one-pack addition curable silicone composition may follow the prior art methods for preparing silicone grease compositions and is not particularly limited, as long as the method involves the step of mixing components (A) to (D) and optionally components (E), (F) and other components. For example, the method may involve the step of mixing components (A) to (F) and optionally other components on a mixer, for example, Thinky Mixer (trade name by Thinky), Trimix, Twin Mix, Planetary Mixer (trade names of mixers by Inoue Mfg., Inc.), Ultra Mixer (trade name of mixer by Mizuho Industrial Co., Ltd.) or Hivis Disper Mix (trade name of mixer by Primix Corp.), or manually mixing them with a spatula or the like.

The one-pack addition curable silicone composition should preferably have a viscosity at 25° C. of 3.0 to 1,000 Pa·s, more preferably 10 to 500 Pa·s. With a viscosity of less than 3.0 Pa·s, workability may worsen, typically shape retention become difficult.

With a viscosity in excess of 1,000 Pa·s, workability may worsen, typically discharging and coating become difficult. A viscosity within the range may be obtained by adjusting the amounts of components. As used herein, the viscosity is a measurement at 25° C. by a Malcom viscometer (rotor A, speed 10 rpm, shear rate 6 s$^{-1}$).

Method for Storing One-Pack Addition Curable Silicone Composition

The one-pack addition curable silicone composition of the invention develops a storage stability of at least 3 months at 25° C. under limited air-shutoff conditions. Specifically, when the one-pack addition curable silicone composition is stored in a closed container made of a material having an oxygen permeability constant of up to $1\times10^{-12}$ cm$^3$ (STP) cm/cm$^2$·s·Pa, the silicone composition develops a long-term storage stability of at least 3 months at 25° C. without thickening or curing. Inversely, if the one-pack addition curable silicone composition is stored in a container made of a material having an oxygen permeability constant of more than $1\times10^{-12}$ cm$^3$ (STP) cm/cm$^2$·s·Pa, then the silicone composition thickens and cures at room temperature, failing to develop a storage stability of at least 3 months at 25° C.

Examples of the material having an oxygen permeability constant of up to $1\times10^{-12}$ cm$^3$ (STP) cm/cm$^2$·s·Pa include polymers such as high density polyethylene (HDPE), low density polyethylene (LDPE), polypropylene, polystyrene, polycarbonate, polyvinyl acetate, polyethylene terephthalate, polyvinyl chloride (PVC), polyvinylidene chloride (PVDC), nylon, polyvinyl fluoride, and polyacrylonitrile, and metal materials such as aluminum and stainless steel.

While the container for storing the one-pack addition curable silicone composition is made of the above material, the container may be constructed by plural members which are made of different materials. As long as the one-pack addition curable silicone composition is stored in such a container, long-term storage stability at room temperature is developed because it becomes possible to prevent airborne oxygen from activating the platinum group metal complex coordinated with an organophosphorus compound.

Method for Curing One-Pack Addition Curable Silicone Composition

When the one-pack addition curable silicone composition is applied as a thin film having a thickness of up to 1,500 μm and exposed to air, addition cure reaction takes place at room temperature (specifically 0 to 40° C., more specifically 10 to 30° C.). When the one-pack addition curable silicone composition is applied to a coating thickness of up to 1,500 μm and exposed to air, airborne oxygen penetrates into the composition to such an extent that the platinum group metal complex coordinated with an organophosphorus compound in the composition may be activated with airborne oxygen whereby addition cure reaction takes place at room temperature. Inversely, if the one-pack addition curable silicone composition is applied to a coating thickness in excess of 1,500 μm and exposed to air, then airborne oxygen may not fully penetrate into the composition, the platinum group metal complex coordinated with an organophosphorus compound in the composition may not be fully activated with airborne oxygen, and addition cure reaction may barely take place at room temperature. Preferably the thin film cures to completion within 1 to 14 days, more preferably within 3 to 10 days.

EXAMPLES

Examples and Comparative Examples are given below for further illustrating the invention although the invention is not limited thereto. Herein, the kinematic viscosity is as measured at 25° C. by an Ostwald viscometer of Ubbelohde type (Sibata Scientific Technology Ltd.). Room temperature (RT) is 25° C.

First, there were furnished the following components, from which one-pack addition curable silicone compositions within the scope of the invention were prepared.

Component (A)
A-1: dimethylpolysiloxane capped at both ends with dimethylvinylsilyl and having a kinematic viscosity of 600 mm$^2$/s at 25° C.
A-2: dimethylpolysiloxane capped at both ends with dimethylvinylsilyl and having a kinematic viscosity of 10,000 mm$^2$/s at 25° C.

Component (B)
B-1: aluminum powder with an average particle size of 10.0 μm (thermal conductivity 237 W/m·° C.)
B-2: zinc oxide powder with an average particle size of 1.0 μm (thermal conductivity 25 W/m·° C.)

Component (C)
C-1: methylhydrogenpolysiloxane having a kinematic viscosity of 90 mm$^2$/s at 25° C., of the following formula

[Chemical Formula 8]

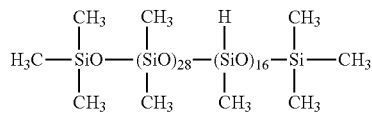

C-2: methylhydrogenpolysiloxane having a kinematic viscosity of 12 mm$^2$/s at 25° C., of the following formula

[Chemical Formula 9]

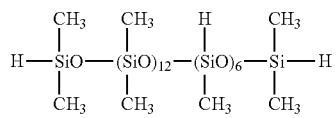

Component (D)
D-1: platinum-trihexyl phosphite complex obtained in Synthesis Example 1 below Synthesis Example 1

A 100-ml flask recovery flask was charged with 0.31 g (0.93 mmol) of trihexyl phosphite, 3.0 g (0.15 mmol of platinum atom) of a solution of platinum-divinyltetramethyldisiloxane complex in the same dimethylpolysiloxane as A-1 (platinum atom content: 1 wt % of platinum atom), and 6.7 g of toluene. The contents were stirred at RT for 3 hours, obtaining 9.8 g of colorless transparent platinum-trihexyl phosphite complex.

D-2: platinum-triphenyl phosphite complex obtained in Synthesis Example 2 below

Synthesis Example 2

A 100-ml flask recovery flask was charged with 0.29 g (0.93 mmol) of triphenyl phosphite, 3.0 g (0.15 mmol of platinum atom) of a solution of platinum-divinyltetramethyldisiloxane complex in the same dimethylpolysiloxane as A-1(platinum atom content: 1 wt % of platinum atom), and 6.7 g of toluene. The contents were stirred at RT for 3 hours, obtaining 9.8 g of colorless semi-transparent platinum-triphenyl phosphite complex.

D-3: solution of platinum-divinyltetramethyldisiloxane complex in the same dimethylpolysiloxane as A-1 (platinum atom content: 1 wt % of platinum atom)

Component (E)
E-1: trimethoxysilyl-containing dimethylpolysiloxane of the following formula

[Chemical Formula 10]

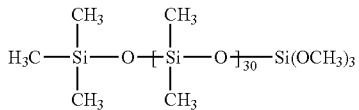

Component (F)
F-1: decyltrimethoxysilane of the following formula

Chemical Formula 11

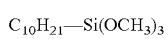

Other Component
G-1: acetylene alcohol of the following formula

[Chemical Formula 12]

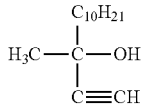

Examples 1 to 8 and Comparative Examples 1 to 5

Preparation of One-Pack Addition Curable Silicone Compositions

One-pack addition curable silicone compositions were prepared by mixing components (A) to (F) and other component in the amounts shown in Tables 1 and 2 according to the following procedure. In Tables 1 and 2, SiH/SiVi designates a ratio of the total number of SiH groups in component (C) to the total number of alkenyl groups in component (A).

On a 5-L planetary mixer (Inoue Mfg., Inc.), components (A), (B), (E) and (F) were fed and mixed at 170° C. for 1 hour. The mixture was cooled to RT (25° C.), to which components (C), (D) and other component were added and mixed until uniform, obtaining a one-pack addition curable silicone composition.

Each of the compositions prepared by the above procedure was measured for viscosity and thermal conductivity and evaluated for RT storage stability and RT cure by the following methods. The results are also shown in Tables 1 and 2.

[Viscosity]

The absolute viscosity of each composition was measured at 25° C. using a Malcom viscometer (type PC-1T).

[Thermal Conductivity]

Each composition was wrapped with kitchen wrapping film and measured for thermal conductivity by meter TPA-501 (Kyoto Electronics Mfg. Co., Ltd.).

[RT Storage Stability]

Each composition was placed in a HDPE container (HDPE's oxygen permeability constant: $2\times10^{-13}$ cm$^3$ (STP) cm/cm$^2$·s·Pa) and, with the container sealed, stored at 25° C. The composition was rated good (O) when the time passed until cure was 3 months or longer and poor (X) when the time passed until cure was less than 3 months. As used herein, "cure" is defined as the state that measurement of absolute viscosity at 25° C. using a Malcom viscometer (type PC-1T) becomes impossible.

[RT Cure]

Each composition was applied onto an aluminum plate to a thickness of 120 μm and then exposed to air at RT (25±2° C.). The composition was rated good (O) when a surface layer and the interior cured within 7 days, and poor (X) otherwise. As used herein, "cure" is defined as the state that when the composition is contacted with the finger, none is transferred to the finger.

TABLE 1

| | | Example | | | | | | | |
|---|---|---|---|---|---|---|---|---|---|
| | | 1 | 2 | 3 | 4 | 5 | 6 | 7 | 8 |
| Formulation (pbw) | A-1 | 100 | | 100 | 100 | 100 | 100 | 100 | 100 |
| | A-2 | | 100 | | | | | | |
| | B-1 | 1,986 | 720 | 1,986 | 1,986 | 1,986 | 1,986 | 874 | 1,986 |
| | B-2 | 434 | 158 | 434 | 434 | 434 | 434 | 215 | 434 |
| | Total of fillers | 2,420 | 878 | 2,420 | 2,420 | 2,420 | 2,420 | 1,089 | 2,420 |
| | C-1 | 4.2 | 1.4 | | 1.4 | 14 | 4.2 | 4.2 | 4.2 |
| | C-2 | | | 4.1 | | | | | |
| | D-1 | 0.7 | 0.7 | 0.7 | 0.7 | 0.7 | | 0.7 | 0.7 |
| | D-2 | | | | | | 0.7 | | |
| | D-3 | | | | | | | | |
| | E-1 | 100 | 50 | 100 | 100 | 100 | 100 | | 100 |
| | F-1 | | | | | | | 6.0 | 6.0 |
| | G-1 | | | | | | | | |
| Evaluation results | SiH/SiVi (number ratio) | 1.5 | 1.5 | 1.5 | 0.5 | 5.0 | 1.5 | 1.5 | 1.5 |
| | Viscosity (Pa · s) | 190 | 174 | 182 | 204 | 148 | 196 | 225 | 166 |
| | Thermal conductivity (W/m · ° C.) | 5.7 | 2.6 | 5.6 | 5.7 | 5.3 | 5.6 | 4.0 | 5.5 |
| | RT storage stability | O | O | O | O | O | O | O | O |
| | RT cure | O | O | O | O | O | O | O | O |

TABLE 2

| | | Comparative Example | | | | |
|---|---|---|---|---|---|---|
| | | 1 | 2 | 3 | 4 | 5 |
| Formulation (pbw) | A-1 | 100 | 100 | 100 | 100 | 100 |
| | A-2 | | | | | |
| | B-1 | 2,582 | 1,986 | 1,986 | 1,986 | 1,986 |
| | B-2 | 564 | 434 | 434 | 434 | 434 |
| | Total of fillers | 3,146 | 2,420 | 2,420 | 2,420 | 2,420 |
| | C-1 | 4.2 | 1.1 | 16 | 4.2 | 4.2 |
| | C-2 | | | | | |
| | D-1 | 0.7 | 0.7 | 0.7 | | |
| | D-2 | | | | | |
| | D-3 | | | | 0.3 | 0.3 |
| | E-1 | 100 | 100 | 100 | 100 | 100 |
| | F-1 | | | | | |
| | G-1 | | | | | 0.3 |
| Evaluation results | SiH/SiVi (number ratio) | 1.5 | 0.4 | 5.7 | 1.5 | 1.5 |
| | Viscosity (Pa · s) | did not become grease | 210 | 141 | cured immediately after mixing of components (C) and (D) | 198 |
| | Thermal conductivity (W/m · ° C.) | | 5.6 | 5.2 | | 5.6 |
| | RT storage stability | | O | O | | X |
| | RT cure | | X | X | | X |

As seen from the results of Tables 1 and 2, the compositions of Examples 1 to 8 within the scope of the invention meet both RT storage stability under limited air-shutoff conditions and RT cure when it is applied as a thin film of up to 1,500 μm and exposed to air. By contrast, the compositions of Comparative Examples 1 to 5 are difficult to meet both RT storage stability under limited air-shutoff conditions and RT cure when it is applied as a thin film of up to 1,500 μm and exposed to air.

Examples 9 to 12 and Comparative Examples 6 to 7

Subsequently, the one-pack addition curable silicone composition was evaluated for RT storage stability in terms of the material of which the container for storing the silicone composition was made. Notably the one-pack addition curable silicone composition used herein was that of Example 1, and the RT storage stability was evaluated by the same procedure as mentioned above. Storage containers were made of the following five materials. The value in parentheses is an oxygen permeability constant.

HDPE ($2 \times 10^{-13}$ cm$^3$ (STP) cm/cm$^2$·s·Pa)
PVC ($3 \times 10^{-15}$ cm$^3$ (STP) cm/cm$^2$·s·Pa)
PVDC ($5 \times 10^{-16}$ cm$^3$ (STP) cm/cm$^2$·s·Pa)
aluminum (~0 cm$^3$ (STP) cm/cm$^2$·s·Pa)
silicone rubber ($6 \times 10^{-11}$ cm$^3$ (STP) cm/cm$^2$·s·Pa)

The one-pack addition curable silicone composition having the same formulation as in Example 1 was stored in containers of the above-described materials and evaluated for RT storage stability, with the results shown in Table 3.

TABLE 3

|  |  | Example | | | | Comparative Example | |
|---|---|---|---|---|---|---|---|
|  |  | 9 | 10 | 11 | 12 | 6 | 7 |
| Storage container material | HDPE | * |  |  |  | * |  |
|  | PVC |  | * |  |  |  |  |
|  | PVDC |  |  | * |  |  |  |
|  | aluminum |  |  |  | * |  |  |
|  | silicone rubber |  |  |  |  | * |  |
|  | Remarks |  |  |  |  |  | not closed |
| RT storage stability |  | ○ | ○ | ○ | ○ | X | X |

As seen from the results of Table 3, the compositions of Examples 9 to 12 within the scope of the invention develop RT storage stability under limited air-shutoff conditions. By contrast, the composition of Comparative Example 6 is difficult to develop RT storage stability under limited air-shutoff conditions.

Examples 13 to 18 and Comparative Examples 8 to 9

Furthermore, the one-pack addition curable silicone composition was evaluated for RT cure in terms of the coating thickness of the silicone composition. Notably the one-pack addition curable silicone composition used herein was that of Example 1, and the RT cure was evaluated by the same procedure as mentioned above except that the coating thickness was changed.

The one-pack addition curable silicone composition having the same formulation as in Example 1 was coated to a varying thickness and evaluated for RT cure, with the results shown in Table 4.

TABLE 4

|  |  | Example | | | | | | Comparative Example | |
|---|---|---|---|---|---|---|---|---|---|
|  |  | 13 | 14 | 15 | 16 | 17 | 18 | 8 | 9 |
| Coating thickness (μm) | 120 | * |  |  |  |  |  |  |  |
|  | 300 |  | * |  |  |  |  |  |  |
|  | 700 |  |  | * |  |  |  |  |  |
|  | 1,000 |  |  |  | * |  |  |  |  |
|  | 1,300 |  |  |  |  | * |  |  |  |
|  | 1,500 |  |  |  |  |  | * |  |  |
|  | 1,700 |  |  |  |  |  |  | * |  |
|  | 2,000 |  |  |  |  |  |  |  | * |
| RT cure |  | ○ | ○ | ○ | ○ | ○ | ○ | X | X |

As seen from the results of Table 4, in Examples 13 to 18 wherein a thin film of up to 1,500 μm was coated and exposed to air, the one-pack addition curable silicone composition develops RT cure. By contrast, in Comparative Examples 8 and 9 wherein a film of more than 1,500 μm was coated and exposed to air, the one-pack addition curable silicone composition is difficult to develop RT cure.

Accordingly, the results of Tables 1 to 4 demonstrate that the one-pack addition curable silicone composition within the scope of the invention meets both "long-term storage stability at room temperature under limited air-shutoff conditions" and "the progress of addition cure reaction at room temperature when it is applied as a thin film of up to 1,500 μm and exposed to air."

It is noted that the invention is not limited to the aforementioned embodiments. While the embodiments are merely exemplary, any embodiments having substantially the same construction as the technical concept set forth in the following claims and achieving equivalent functions and results are believed to be within the spirit and scope of the invention.

The invention claimed is:

1. A method for storing a one-pack addition curable silicone composition comprising as essential components:
   (A) 100 parts by weight of an organopolysiloxane containing at least two silicon-bonded aliphatic unsaturated hydrocarbon groups per molecule and having a kinematic viscosity of 60 to 100,000 mm$^2$/s at 25° C.,
   (B) 100 to 3,000 parts by weight of at least one heat conductive filler selected from the group consisting of metals, metal oxides, metal hydroxides, metal nitrides, metal carbides, and carbon allotropes,
   (C) an organohydrogenpolysiloxane containing at least two silicon-bonded hydrogen atoms (i.e., SiH groups) per molecule in such an amount that the number of SiH groups divided by the total number of aliphatic unsaturated hydrocarbon groups in component (A) is 0.5 to 5, and
   (D) an effective amount of a metal complex coordinated with an organophosphorus compound represented by the general formula (1):

$$R^1_x\text{—P—}(OR^1)_{3-x} \quad (1)$$

wherein R$^1$ which may be the same or different is an optionally substituted monovalent hydrocarbon group of 1 to 20 carbon atoms, and x is an integer of 0 to 3, wherein the metal is selected from the group consisting of ruthenium, rhodium, palladium, osmium, iridium and platinum, comprising the step of storing the one-pack addition curable silicone composition in a closed container made of a material having an oxygen permeability constant of up to $1 \times 10^{-12}$ cm$^3$ (STP) cm/cm$^2$·s·Pa, whereby the silicone composition develops a storage stability of at least 3 months at 25° C.

2. The method of claim 1, wherein the one-pack addition curable silicone composition further comprises (E) 1 to 200 parts by weight per 100 parts by weight of component (A) of a hydrolyzable organopolysiloxane compound having the general formula (2):

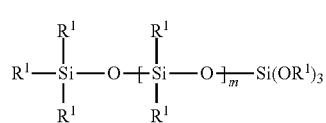
(2)

wherein $R^1$ which may be the same or different is an optionally substituted monovalent hydrocarbon group of 1 to 20 carbon atoms, and m is an integer of 5 to 100.

3. The method of claim 1, wherein the one-pack addition curable silicone composition further comprises (F) 0.01 to 10 parts by weight per 100 parts by weight of component (A) of a hydrolyzable organosilane compound having the general formula (3):

$$R^2\text{—}Si(OR^1)_3 \quad (3)$$

wherein $R^1$ which may be the same or different is an optionally substituted monovalent hydrocarbon group of 1 to 20 carbon atoms, and $R^2$ is an optionally substituted monovalent hydrocarbon group of 1 to 20 carbon atoms.

* * * * *